July 28, 1959 H. J. GEISLER ET AL 2,897,402

MULTI-PHANOTRON SWITCHING TUBE

Filed May 28, 1953

INVENTORS
HELMUT JOHN GEISLER
DONALD R. YOUNG

BY

William V. Schelberg
AGENT

United States Patent Office 2,897,402

Patented July 28, 1959

2,897,402

MULTI-PHANOTRON SWITCHING TUBE

Helmut John Geisler, Wappingers Falls, and Donald R. Young, Poughkeepsie, N.Y., assignors to International Business Machines Corporation, New York, N.Y., a corporation of New York Application May 28, 1953, Serial No. 357,957

6 Claims. (Cl. 315—84.6)

This invention relates to switching circuits and more particularly to a heated cathode gas tube employed to perform logical switch functions in low impedance circuits.

Logical "and" circuits are variously known as gates or coincidence circuits and are employed throughout accounting equipment and computers for widely different purposes. Generally, a logical "and" circuit or gate is a circuit having a plurality of inputs and a single output and is so designed that an output signal is obtained only when input signals are received on two or more inputs. A logical "or" circuit, sometimes referred to as a buffer, isolating circuit or anti-coincidence circuit, is a circuit having a plurality of inputs and a single output and is designed to produce an output signal when signals are received at only one input or set of inputs.

Combinations of gates and buffers are also employed, and it is to such a combination logical switching system that the present invention is more specifically directed.

One broad object of the invention is to provide a multiphanotron tube comprising a heated cathode gaseous switching device with internal connections which is adapted for the performance of logical switching functions.

Another object of the invention is to provide a gas switching tube having a current capacity of sufficient magnitude for direct operation of electromechanical devices such as relays.

Still another object is to provide a heated cathode gas switching tube which is relatively independent of ambient temperature variations, has a high current capacity, a low forward resistance and which operates without production of undesirable oscillators in switching.

Another object of this invention is to provide a heated cathode gas switching tube connected so as to function as two logical "and" circuits working into a logical "or" circuit.

Other objects of the invention will be pointed out in the following description and claims and illustrated in the accompanying drawings, which disclose, by way of example, the principle of the invention and the best mode, which has been contemplated, of applying that principle.

Figure 1:
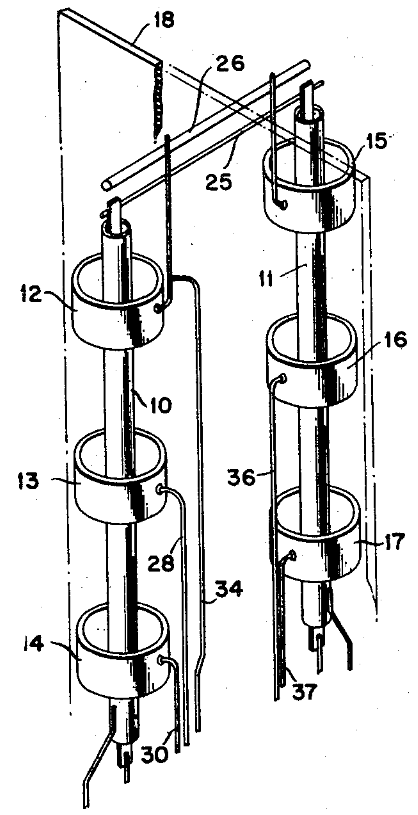
Figure 1 is a schematic illustration showing the basic features of construction of elements of the multi-phanotron tube.

Referring to Figure 1, a pair of indirectly heated cathodes 10 and 11 are supported in spaced relation and extend in a direction parallel with the logitudinal axis of the tube. Two groups of three cylindrical anode designated 12 to 14 and 15 to 17 are spaced apart from one another and positioned about the several cathode. A mica partition or shield 18 is used to isolate the two cathode-anode assemblies. Anodes 12 and 15 are connected internally to allow use of a standard nine pin tube base, however, it is obvious that this connection may be made externally. With this arrangement the nine tube pins provide external connections for the cathodes 10 and 11, the two heater leads, the anodes 13, 14, 16 and 17 and a single connection for both the anodes 12 and 15.

Figure 2:
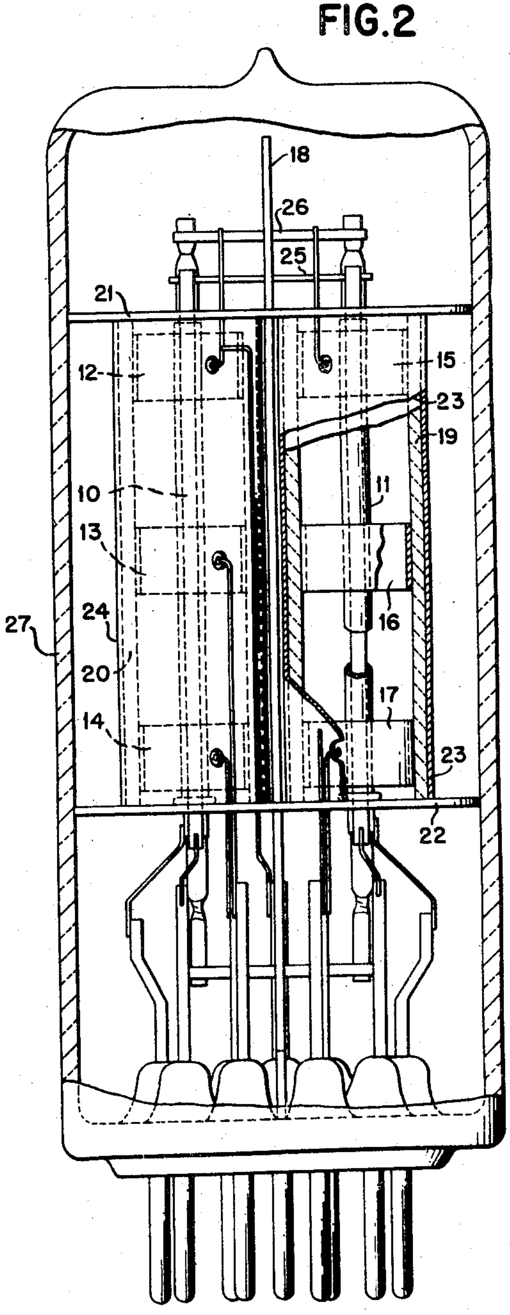
Figure 2 is an enlarged illustration of the tube with a portion of the envelope removed.

As shown in Figure 2, tubular ceramic members 19 and 20 are employed for support of the anodes comprising the two groups and further support is provided by the mica partitions 21 and 22 positioned at the ends of the assembly. Nickel heat shields 23 and 24 encompass each stack comprising a cathode and three anodes, with shield 23 shown partially cut away in the figure. A connector 25 couples the heaters of both cathodes at their upper ends, and a connector 26 couples the anodes 12 and 15 as previously described.

The above tube structure is mounted within an envelope 27 of glass or other suitable material which is filled with a rare gas such as argon or hydrogen or a mixture of such gases at conventionally employed ionization pressures. The cathodes 10 and 11 are capable of delivering peak currents of two amperes and can operate continuously at 200 milli-amperes for each diode section with a differential potential of 100 volts thereacross. The heater power is 10 watts and the insulation between each cathode and heater is designed to withstand 150 volts at either polarity. The capacity between the cathode and anode of each section is less than 5 micro-microfarads, with a maximum inverse current less than 10 micro-amperes at −150 volts.

A particular advantage of the heated cathode tube over cold cathode discharge devices resides in freedom from oscillations often encountered in the latter and a decrease in the time lag for initial operation. Once ionized, the multi-phanotron will respond to one half microsecond pulses and will discriminate with a 5:1 selection ratio between pulses occurring during gate time and 2 microseconds after gate time into a 1 K ohm load as shown in Figure 3.

Figure 3:
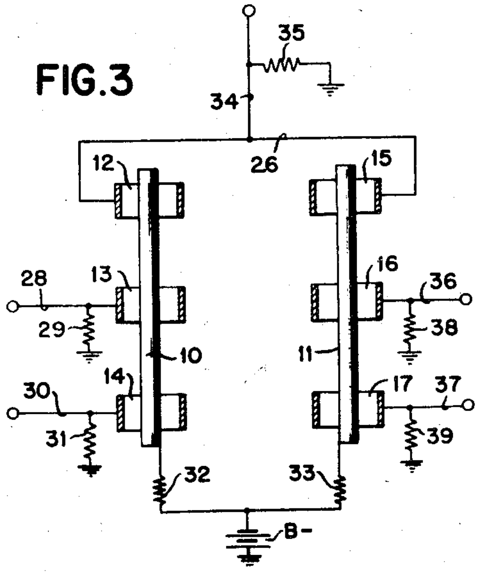
Figure 3 illustrates a simple logical circuit employing the tube shown in Figures 1 and 2.

Referring to the circuit diagram of Figure 3, the anodes 13 and 14 in combination with the cathode 10 constitute a first negative "and" circuit while anodes 16 and 17 in combination with the cathode 11 constitute a second negative "and" circuit. The two negative "and" circuits feed a negative "or" circuit comprising the anodes 12 and 15 in combination with cathodes 10 and 11. An input conductor 28 is coupled to the tube pin which is connected to anode 13 and a resistor 29 is connected between this lead and ground. Another input conductor 30 is connected to anode 14 through the associated tube pin and a further resistor 31 connected between this lead and ground. Resistors 32 and 33 are connected between the tube pins associated with the cathodes 10 and 11 respectively and a negative source of potential B−. The anodes 12 and 15 are connected as previously described by the lead 26 and the latter is coupled to a single tube pin and to an output lead 34 to which a load resistor 35 is connected.

Each of the diode sections is normally in a conductive state with current path being traceable, for example for anode 13, from ground, through resistor 29, lead 28, anode 13, cathode 10, resistor 32 to the negative voltage source B−. The current paths for anodes 12, 13 and 14 include resistances 35, 29 and 31 respectively and the cathode resistor 32 while the current paths for anodes 15, 16 and 17 include resistances 35, 38 and 39 respectively and the cathode resistor 33. The values of the several resistors are not critical and may be varied within a wide range for each operating voltage selected. With the source B taken as 100 volts, resistors 32, 33 and 35 are of approximately 1 K or 1000 ohms magnitude and resistors 29, 31, 38 and 39 about half this value. On coincident application of negative signal impulses to leads 28 and 30, the discharge between cathode 10 and anodes 13 and 14 simultaneously lessens, and the current flow through resistor 32 lessens proportionately. The IR drop through resistance 32 is thereby reduced and cathode 10 approaches more nearly to the potential of source B— so that a greater voltage drop is now present between the anode 12 and cathode 10. This occasions an increase in current through the left side of the "or" circuit and an increased negative voltage drop appears across resistor 35. The coincident application of negative input pulses to leads 28 and 30 thus results in a negative output pulse appearing on line 34. Employing this section of the tube alone a negative "and" circuit is provided.

Conductors 36 and 37 are connected to anodes 16 and 17 respectively and operate in a similar manner so that coincident application of negative signal pulses to these conductors lowers the potential of cathode 11. The increased voltage drop between anode 15 and cathode 11 as a result causes a greater current flow through resistor 35 and an increased negative voltage drop thereacross. This tube section, therefore, constitutes a second negative "and" circuit.

Coincident application of negative input pulses to leads 28 and 30 or to leads 36 and 37 will result in a negative output pulse and the two "and" circuits function as a negative "or" circuit since coincident application of pulses to either pair of inputs produces an output signal.

By proper adjustment of values of the circuit parameters with diode sections including anodes 13, 14, 16, 17 maintained in a normally non-conductive state or state of diminished conductivity, the multi-diode tube circuit may be caused to operate in a somewhat different fashion. With such an arrangement, a positive signal pulse applied to any one of the input leads 28, 30, 36 or 37 initiates or increases the conduction in the diode to which the particular lead is connected. Conduction between cathode 10 and either anode 13 or 14 raises the potential of cathode 10 and this electrode becomes positive with respect to anode 12 with consequent reduction in current flow through a path including the load resistor 35. The tube section including leads 28 and 30, therefore, functions as a plus "or" circuit. In a similar manner, conduction initiated or increased between cathode 11 and either of the anodes 16 or 17 raises the potential of cathode 11 so that the latter becomes positive with respect to anode 15 with a consequent reduction in current flow through this path and the resistor 35. The tube section controlled by leads 36 and 37, therefore, functions as a second plus "or" circuit. With proper relative values of the cathode resistors 32 and 33 with respect to load resistor 35, current flow through both plus "or" circuit paths must be reduced to produce an appreciable decrease in the voltage drop across resistor 35 and consequent positive output pulse on lead 34. The pairs of input leads 28—30 and 36—37, therefore, constitute plus "or" circuits and are combined to produce a plus "and" circuit output on lead 34 when operated in this manner.

Modifications of the multi-diode switching tube may be made by positioning additional anode elements adjacent the cathodes 10 and 11 as well as by providing further complete cathode-anode sections. In this manner negative "and" and positive "or" logical circuit combinations having three or more inputs may be provided.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention.

It is the intention, therefore, to be limited only as indicated by the scope of the following claims.

What is claimed is:

1. In combination, an electric discharge device comprising a sealed envelope having terminal prongs and containing an ionizable gaseous atmosphere at glow discharge pressure, a plurality of cylindrical cathodes mounted within said envelope, indirect heating means for said cathodes, a plurality of anode rings positioned about each individual cathode in spaced relationship thereto, and circuit connections between said prongs and corresponding ones of said cathodes and anodes.

2. An electric discharge device as set forth in claim 1 wherein said cathodes and anodes comprise two diode groups each including a single cathode and three anodes; circuit means directly connecting an anode of each of said groups within said envelope; and an individual terminal prong connected to said circuit means.

3. A logical switching system comprising an electric discharge device as set forth in claim 2 including means connected to said terminal pins for two anodes of each group of diodes for applying signals thereto; and means for sensing a changed rate of conductivity at the anode of the remaining diode of each said group upon coincident application of signals to said two anodes of that group.

4. An electrical discharge device as set forth in claim 1 and adapted to function as an And circuit wherein said cathodes and said anode rings comprise at least one diode group having three anodes positioned adjacent one cathode; means including a source of voltage coupled to said one cathode and said three adjacent anodes for establishing a glow discharge therebetween, means for selectively applying voltage pulses to a first and a second one of said three anodes to reduce the glow discharge thereto; and means for detecting an increase in the glow discharge between said one cathode and the third anode resulting from coincident application of said voltage pulses to said first and second anodes.

5. An electrical discharge device as set forth in claim 1 and adapted to function as an Or circuit wherein said cathodes and said anode rings comprise at least one diode group having three anodes positioned adjacent one cathode; means including a source of voltage coupled to said one cathode and a first one of said three anodes to establish a glow discharge therebetween; means for selectively applying voltage pulses to the remaining ones of said three anodes to establish a glow discharge thereto; and means for detecting a reduction in the glow discharge to said one anode due to establishment of a glow discharge to at least one of the remaining ones of said three anodes.

6. A gas switch tube adapted to perform logical switch functions comprising a sealed envelope containing an ionizable gaseous atmosphere at glow discharge pressure, a plurality of cylindrical cathodes mounted within said envelope, a plurality of anode rings positioned about each of said cathodes in spaced relationship and individual thereto, an output pin terminal directly connected to one of the anodes associated with each of said cathodes and input pin terminals connected to the remaining ones of said anodes.

References Cited in the file of this patent

UNITED STATES PATENTS

| | | |
|---|---|---|
| 2,427,533 | Overbeck | Sept. 16, 1947 |
| 2,432,608 | Desch | Dec. 16, 1947 |
| 2,473,159 | Lyman | June 14, 1949 |
| 2,553,263 | Loughren | May 15, 1951 |
| 2,565,103 | Toulon | Aug. 21, 1951 |
| 2,573,373 | Wales | Oct. 30, 1951 |
| 2,618,766 | Cowan | Nov. 18, 1952 |

FOREIGN PATENTS

| | | |
|---|---|---|
| 680,991 | Great Britain | Oct. 15, 1952 |